United States Patent

[11] 3,545,792

[72] Inventor William N. Myers
Huntsville, Alabama
[21] Appl. No. 830,715
[22] Filed June 5, 1969
[45] Patented Dec. 8, 1970
[73] Assignee To the United States of America as represented by the Administrator of the National Aeronautics and Space Administration

[54] DUCT COUPLING FOR SINGLE-HANDED OPERATION
No Claims, 1 Drawing Fig.
[52] U.S. Cl. .......................................................... 285/38,
285/317, 285/314, 285/406
[51] Int. Cl. ....................................................... F16l 37/10
[50] Field of Search .......................................... 285/317,
(S.F.), 308, 310, 277, 320(Cursory), 406, 364,
314, 312(Cursory), 38

[56] References Cited
UNITED STATES PATENTS
1,857,528 5/1932 Cantell .......................... 285/317X
2,069,377 2/1937 Matthiessen ................. 285/277
3,083,042 3/1963 Collar ............................ 285/314X
3,298,715 1/1967 Stehle ............................ 285/277X
3,346,276 10/1967 Snyder ........................... 285/277X
FOREIGN PATENTS
607,011 7/1960 Italy ............................... 285/277

Primary Examiner—Thomas F. Callaghan
Attorneys—L. D. Wofford, W. H. Riggins and G. T. McCoy ABSTRACT: A quick disconnect coupling for a pair of duct sections which coupling may be operated with the use of one hand. A first duct section carries spring-urged latches that engage a second duct section. The latches are spring-biased toward the locking position and are moved to the unlocking position by the rotation of a ring rotatably mounted on the first duct section. The ring is rotated by manipulation of a handle that is associated with the ring and the first duct section.

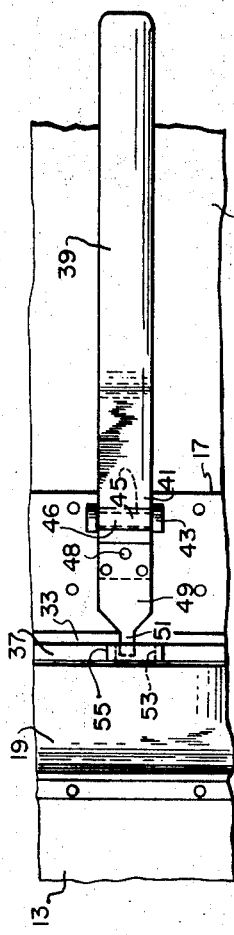

# 3,545,792

DUCT COUPLING FOR SINGLE-HANDED OPERATION

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates generally to coupling devices and more particularly to a quick disconnect coupling for joining two duct sections.

A large variety of couplings for duct sections are known in the prior art and are used in varying circumstances depending on the particular requirements of the coupling. For some purposes there is a need for a duct coupling that may be actuated with the use of a single hand while at the same time providing a dependable coupling. One special need for a coupling of this nature has arisen in the field of space exploration wherein astronauts traveling for extended periods in spacecraft need the capability in the zero gravity environment of doing as many things as possible in a quick and convenient manner and preferably with the use of only one hand. This need applies, for example, to the making of connections between a flexible duct and a fixed duct outlet in the wall of the spacecraft. In addition to the desirability of actuating the coupling with one hand, it is further desirable that the coupling may be effected without having to rotate the duct sections being joined for the purpose of aligning locking mechanisms such as latches.

SUMMARY OF THE INVENTION

The invention comprises a first duct section that telescopically receives the end of a second duct section whereupon a series of spring-biased latches carried by the first section snap into locking engagement with the second section. A ring is rotatably mounted on the first duct section and engages each of the latches in a manner such that when the ring is rotated each of the latches are forced to their unlocking position. Rotation of the ring is accomplished by manipulating a handle carried by the first duct section.

Accordingly, it is a general object of the present invention to provide an improved quick disconnect coupling for duct sections.

A more specific object of the invention is to provide a coupling for duct sections which may be operated by the use of only one hand.

Another object of the invention is to provide a quick disconnect coupling for duct sections that may be quickly and easily operated in a zero gravity environment and thus may be used by astronauts traveling in a spacecraft.

These and other objects and advantages of the invention will become apparent upon reference to the following specification, attendant claims and drawing.

BRIEF DESCRIPTION OF THE DRAWING

FIG. 1 is an elevational view, partially in section, illustrating the coupling of the present invention.

FIG. 2 is a cross-sectional view taken along line 2–2 of FIG. 1.

FIG. 3 is a view taken along line 3–3 of FIG. 1.

FIG. 4 is a view of a ring the rotation of which actuates the latches of the coupling.

DESCRIPTION OF THE PREFERRED EMBODIMENT

Referring to FIG. 1, therein is shown a duct section 11 joined to a duct section 13 by the coupling device of the present invention. The duct section 13 is shown as a fixed outlet duct projecting from a wall 15 and may be an outlet in a spacecraft for a source of environmental control gasses such as an oxygen-nitrogen mixture. The duct 11 may be a flexible duct for conducting the gasses to a desired area.

The duct section 11 is provided with a pair of cylindrical fittings 17 and 19. The fitting 17 telescopically receives a part of the fitting 19 which abuts the end of the duct section 11 that is telescopically disposed in the fitting 17. The fittings 17 and 19 are secured by rivets 21 and the fitting 17 is joined to the duct section 11 by rivets 23 or other suitable means.

The fitting 19 changes diameter, forming two shoulder surfaces 27 and 29, the latter being in contact with the end of the fitting 17. The large diameter part of the fitting 19 has a flared end portion 31. The fitting 17 has an annular flange 33 extending therearound and spaced a short distance from the shoulder surface 29 forming a groove 35 that receives a ring 37. The ring 37 fits closely around the fitting 17 and is adapted to be rotated reciprocally by manipulating a handle 39.

The handle 39 has an extension 41 (see FIG. 3) disposed between two lugs 43 that are welded to the exterior of the fitting 17. Extending between the lugs 43 near the top thereof is a pin 45 inside a rotating sleeve 46 to which the extension 41 is welded at 47. Joined to the handle extension 41 by rivets 48 is a nose element 49 having a relatively narrow end 51 that projects into a slot 53 of the ring 37. As shown in FIG. 4 the slot 53 is diagonally oriented and is formed mainly in a projecting lug 55 of the ring 37. The handle 39 is biased in a clockwise direction by a spring 56 bearing on the underside of the nose element 49. and being fastened by a rivet 57 to the fitting 17.

Spaced circumferentially around the large diameter part of the fitting 19 are a series of latches 58. Each of the latches 58 comprises a dog portion 59 (FIG. 2) positioned in a slot 61 in the wall of the fitting 19. The dog portions 59 are attached to the fitting 19 by springs 63 secured by rivets 65 to the fitting 19. The springs 63 are joined to the respective dog portions by rivets 67. Projecting from each dog portion 59 is a lug 69 that extends into and bears upon the surface of a slot 71 in the ring 37. As shown in FIG. 4, each of the slots 71 in the ring 37 has an inclined or cam surface 73, the purpose of which will be explained in connection with the operation of the coupling.

The duct section 13 is provided with a cylindrical fitting 75 that has an annular rib 77 at the end thereof. The fitting 75 fits within the flared end portion 31 of the fitting 19.

In operation the fitting 19 of the duct section 11 is guided over the fitting 75 of the fixed duct section 13. As the fitting 75 enters the fitting 19 the dog portions 59 of the respective latches 58 are forced outwardly against the springs 63 by the rib 77 and when the end of the fitting 75 abuts the shoulder surface 27 of the fitting 19 the latches 58 snap inwardly with the dog portions 59 locking against the rib 77. When it is desired to disconnect the duct sections 11 and 13 the handle 39 is rotated counterclockwise against the spring 56. The end 51 of the nose element 49 shifting downwardly in the diagonal slot 53 causes the ring 37 to rotate in a clockwise direction. Upon clockwise rotation of the ring 37, the inclined surfaces 73 of the slots 71 raise the respective lugs 69 of the latches 58 to permit separation of the duct sections 11 and 13. When the handle 39 returns to its normal position the ring 37 rotates counterclockwise permitting the latches to return to the locking position.

I claim:
1. In a coupling for a pair of duct sections:
   a. A duct section comprising an open end portion bearing a plurality of circumferentially spaced latches movable between locking and unlocking positions;
   b. means for resiliently biasing said latches toward said locking position;
   c. a rotatable shifting element movably mounted on said duct section and having means associated with each of said latches for producing locking and unlocking motion of said latches upon shifting of said element;
   d. a handle pivotally mounted on said duct section;
   e. means on said shifting element and said handle for rotating said shifting element upon pivotal movement of said handle; and f. said duct section being adapted for telescopic engagement with a second duct section whereby said latches lockingly engage said second duct section.

2. The invention as defined in claim 1 wherein said shifting element comprises a ring encircling said duct section and is adapted for reciprocal rotation, said means for rotating said ring comprising a slot in said ring having a diagonal surface, said handle having an extension projecting into said slot and bearing on said surface whereby movement of said handle will cause said diagonal surface to slide on said extension and produce rotation of said ring.

3. The invention as defined in claim 1 wherein said handle has a hand grip portion disposed longitudinally of said duct section, said handle being spring-biased toward the latching position of said coupling.

4. The invention as defined in claim 1 wherein said shifting element comprises a ring encircling said duct section and being adapted for reciprocal rotation, said means of said ring associated with each of said latches comprising a plurality of slots circumferentially spaced around said ring, said slots corresponding to said latches, each of said slots having a camming surface, each of said latches having a lug extending, respectively, from said latches to said slots and bearing on said camming surface whereby rotation of said ring will cause said camming surfaces to slide on said lugs and actuate said latches.

5. The invention as defined in claim 4 wherein said open end portion of said duct section comprises a cylindrical fitting, a plurality of openings circumferentially spaced around said fitting, each of said latches being mounted in alignment with one of said openings and having a locking part thereof projecting through said openings inwardly of said fitting.

6. The invention as defined in claim 4 wherein said slots in said ring are formed in the outer surface of said ring.